(12) United States Patent
Ko

(10) Patent No.: US 9,718,550 B2
(45) Date of Patent: Aug. 1, 2017

(54) SEAT ARRANGEMENT OF A PASSENGER CABIN

(75) Inventor: Djunianto Ko, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 13/643,117

(22) PCT Filed: May 3, 2011

(86) PCT No.: PCT/EP2011/002195
§ 371 (c)(1),
(2), (4) Date: Dec. 5, 2012

(87) PCT Pub. No.: WO2011/141134
PCT Pub. Date: Nov. 17, 2011

(65) Prior Publication Data
US 2013/0068887 A1   Mar. 21, 2013

(30) Foreign Application Priority Data
May 4, 2010 (DE) ........................ 10 2010 019 192

(51) Int. Cl.
*B64D 11/06* (2006.01)
*B65G 47/08* (2006.01)
*B65G 47/91* (2006.01)

(52) U.S. Cl.
CPC .......... *B64D 11/06* (2013.01); *B64D 11/0601* (2014.12); *B64D 11/064* (2014.12);
(Continued)

(58) Field of Classification Search
CPC ... B64D 11/06; B64D 11/0606; B64D 11/064; B64D 11/0636; B64D 11/0601; B65G 47/082; B65G 47/917
(Continued)

(56) References Cited

U.S. PATENT DOCUMENTS

2007/0241235 A1   10/2007   Atchison
2010/0065684 A1   3/2010   Ruiter et al.

FOREIGN PATENT DOCUMENTS

JP   2009-513419 A   4/2009
WO   2005/014395 A1   2/2005
(Continued)

OTHER PUBLICATIONS

International Search Report of the International Searching Authority mailed Sep. 30, 2011 for the corresponding international application No. PCT/EP2011/002195 (with English translation).
(Continued)

*Primary Examiner* — Valentina Xavier
(74) *Attorney, Agent, or Firm* — Posz Law Group, PLC

(57) ABSTRACT

A seat arrangement of a passenger cabin includes at least two seat groups. The at least two seat groups are arranged consecutively between two passenger aisles running parallel to a longitudinal direction of the passenger cabin and each have two outer seat units and just one central seat unit. The seat units are set in a seating configuration. A central seat unit of at least one of the at least two seat groups is arranged offset with respect to at least one of the outer seat units of the same seat group in the longitudinal direction of the passenger cabin, as a result of which each seat unit has obstacle-free access to at least one cabin aisle.

23 Claims, 2 Drawing Sheets

(52) U.S. Cl.
    CPC ...... *B64D 11/0606* (2014.12); *B64D 11/0636* (2014.12); *B65G 47/082* (2013.01); *B65G 47/917* (2013.01)

(58) Field of Classification Search
    USPC .............. 244/185, 118.6, 122 R; 297/63, 65, 297/354.13, 232
    See application file for complete search history.

(56) References Cited

FOREIGN PATENT DOCUMENTS

| | | |
|---|---|---|
| WO | 2006/054064 A1 | 5/2006 |
| WO | 2007/003889 A1 | 1/2007 |
| WO | 2008/072328 A1 | 6/2008 |
| WO | 2009/013445 A1 | 1/2009 |
| WO | 2009/073244 A1 | 6/2009 |

OTHER PUBLICATIONS

German Search Report issued from the German Patent Office mailed Jun. 10, 2011 for the corresponding German patent application No. 10 2010 019 192.2.
Office Action mailed Feb. 10, 2015 issued in corresponding JP patent application No. 2013-508392 (and English translation).
Office Action dated Oct. 25, 2016 issued in corresponding EP patent application No. 11 722 306.5 (and English translation).
German Search Report dated Jun. 10, 2011 issued in corresponding DE patent application No. 10 2010 019 192.2 (partial English translation only).
International Preliminary Report on Patentability dated Nov. 6, 2012 issued in corresponding International patent application No. PCT/EP2011/002195.

SEAT ARRANGEMENT OF A PASSENGER CABIN

CROSS REFERENCE TO RELATED APPLICATIONS

This application is a U.S. national stage application of PCT/EP2011/002195 filed on Mar. 3, 2011, and claims priority to, and incorporates by reference, German patent application No. 10 2010 019 192.2 filed on May 4, 2010.

BACKGROUND

Seat arrangements in passenger cabins having a plurality of seat groups each comprising three seats arranged parallel and side-by-side are already known. With this seat arrangement passengers who sit remotely from a cabin aisle are forced to move past or climb over neighboring seats. This is not satisfactory with regard to a comfort requirement of the passengers.

The present invention enhances the comfort in a passenger cabin while at the same time meeting existing safety requirements. The seating arrangements described herein provide easier movement of passengers to and from a cabin aisle to a passenger seat.

SUMMARY

The invention is based on a seat arrangement of a passenger cabin comprising at least two seat groups, wherein the at least two seat groups are arranged one behind the other between two cabin aisles running parallel to a longitudinal direction of the passenger cabin and each comprise two outer seat units and exactly one central seat unit, the seat units being set in a sitting configuration.

It is proposed that a central seat unit of at least one of the at least two seat groups is arranged offset to at least one of the outer seat units of the same seat group in a longitudinal direction of the passenger cabin, whereby each seat unit has unobstructed access to at least one cabin aisle. In this case a "longitudinal direction of the passenger cabin" should be understood to mean, in particular, a main direction of extension of the passenger cabin extending parallel to a cabin central axis and oriented substantially in a forward movement direction of the passenger cabin. A "cabin aisle" should be understood to mean a space in a seat arrangement which is provided to allow movement of passengers within the seat arrangement, for example in order to move to an allocated seat unit. "Cabin aisles running parallel" should be understood to mean, in particular, cabin aisles the main directions of extension of which run parallel to one another. "One behind the other" should be understood in this context to mean, in particular, oppositely to the longitudinal direction of the passenger cabin. Furthermore, in the following description the terms "in front of", "at the front", "at the rear", "rearward", "front side", "forward side", "rear side", etc., relate to the longitudinal direction of the passenger cabin. In addition, the terms "at the top", "at the bottom", "above", "below", etc., relate to a vertical direction disposed perpendicularly to a cabin floor of the passenger cabin and starting therefrom. In this connection "unobstructed" should be understood to denote, in particular, a free access width of at least 30 cm, preferably 50 cm and especially preferably 70 cm. As a result of this seat arrangement a passenger using the seat unit on a seat unit can reach the cabin aisle at any time in a simple and comfortable manner independently of a seated neighbor of the passenger and of the sitting or reclining configuration thereof. In this case detriment to or disturbance of another passenger can advantageously be avoided. Furthermore, an evacuation time in an emergency can advantageously be shortened. In order to transfer from one cabin aisle to the other cabin aisle because of a blocked cabin aisle, a central seat unit can advantageously be used as a passageway and an otherwise usual, longer transit distance can be avoided. A passenger on a central seat unit can especially advantageously reach both cabin aisles in an unobstructed manner. Furthermore, for passengers with restricted movement each seat unit can be reached in a simple manner.

In an advantageous configuration of the invention, it is proposed that at least one of the seat units is rotated in a seat direction with respect to the longitudinal direction of the passenger cabin, whereby the seat units can advantageously be arranged especially close together and the number of seat units in the passenger cabin can be increased while the seating comfort remains the same. In this context, a "seat direction" should be understood to mean a direction which is defined by an axis starting perpendicularly from a main support surface of the backrest, with a backrest of a seat unit standing perpendicularly to a cabin floor.

It is further proposed that the number of connecting passageways between the cabin aisles running transversely to the longitudinal direction of the passenger cabin is at least equal to the number of central seat units which are in a sitting configuration, whereby a multiplicity of connecting passageways, and therefore additional comfort for the passengers, can be created. In this case, a "connecting passageway" should be understood to mean, in particular, an unobstructed through-passage from one cabin aisle to the other cabin aisle.

In a further configuration of the invention it is proposed that at least one plane arranged perpendicularly to the longitudinal direction of the passenger cabin intersects at least two seat groups, whereby an especially advantageous, close arrangement of the seat groups with respect to one another, and therefore an optimum utilization of space, can be achieved.

If at least one of the at least two seat groups has at least one privacy unit which is provided in order to screen the seat units of the respective seat group at least towards the rear, undesired eye contact can advantageously be avoided and an environment which is felt to be especially private can be created. In this context, a "privacy unit" should be understood to mean a unit which is provided to screen a passenger from the sight of other passengers.

It is further proposed that at least two of the seat units of one of the at least two seat groups are at least partially surrounded by the at least one privacy unit, whereby screening from sight can be established especially simply and cost-effectively.

In a further configuration of the invention it is proposed that the at least one privacy unit is formed in one piece, whereby the screening from sight can be installed especially simply and cost-effectively. The privacy unit may be produced especially preferably from a plastics material.

If at least one of the seat units has a footrest unit, additional comfort for a passenger can be achieved. In this context a "footrest unit" should be understood to mean a unit which is provided in order to provide a footrest surface. This unit may be, especially preferably, a footstool.

In a further configuration of the invention it is proposed that the footrest unit includes a stowage unit, whereby additional stowage space for luggage items, magazines, etc., can be created.

In addition, at least one seat unit is proposed which can be converted from a sitting configuration to a reclining configuration and inversely, whereby comfort can be enhanced while retaining unimpeded access to a cabin aisle. Especially advantageously, a distance of a leg-supporting element of the at least one seat unit from the footrest unit is less than 5 cm in the reclining configuration.

BRIEF DESCRIPTION OF THE DRAWINGS

Further advantages are apparent from the following description of the drawing. In the drawing an exemplary embodiment of the invention is represented. The description and the claims contain numerous features in combination. The person skilled in the art will also advantageously consider the features in isolation and bring them together to form useful further combinations.

DETAILED DESCRIPTION

Figure 1:
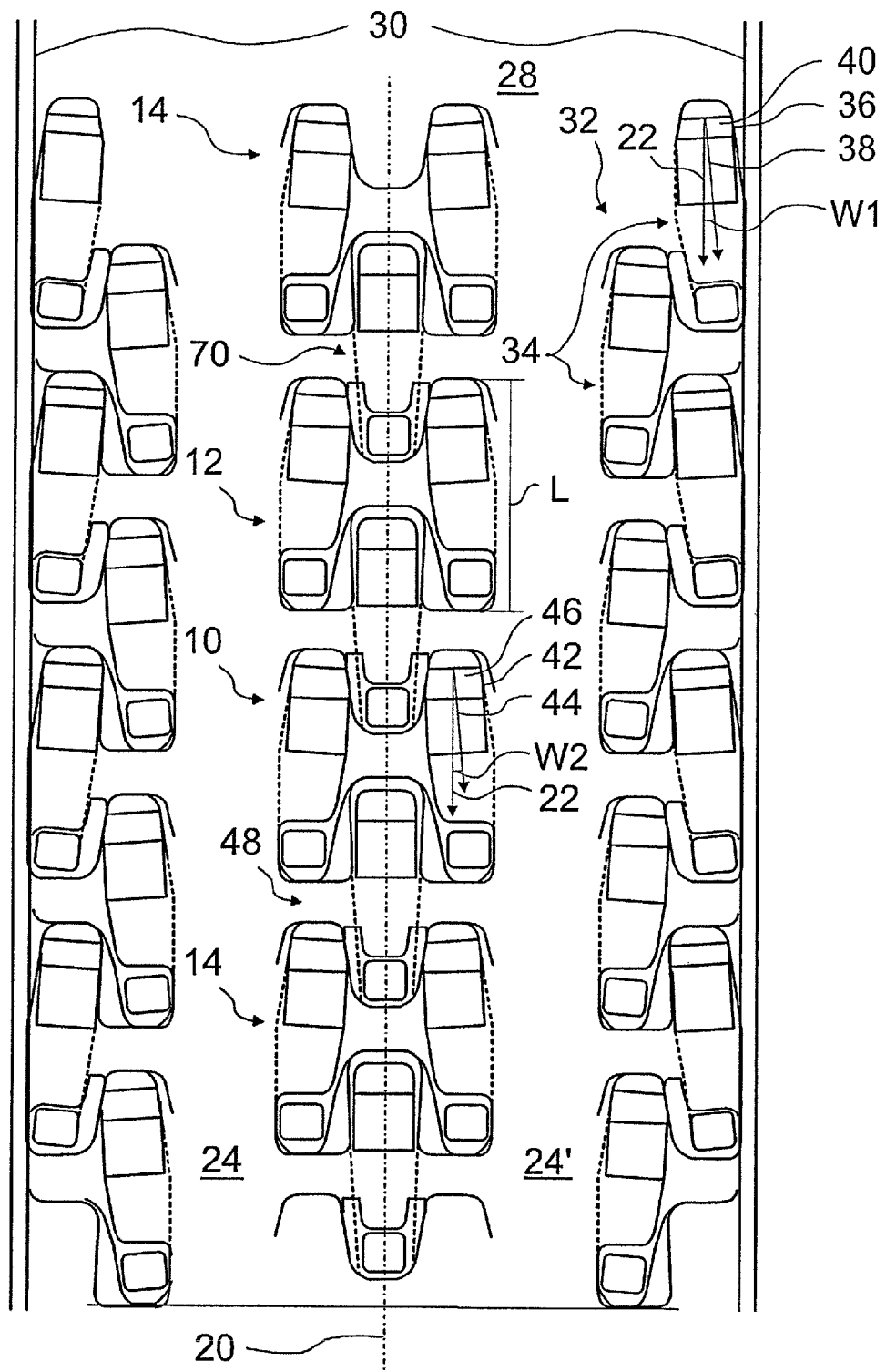
FIG. 1 is a schematic view of a seat arrangement of an aircraft cabin comprising seat groups and seat units.
Figure 2:
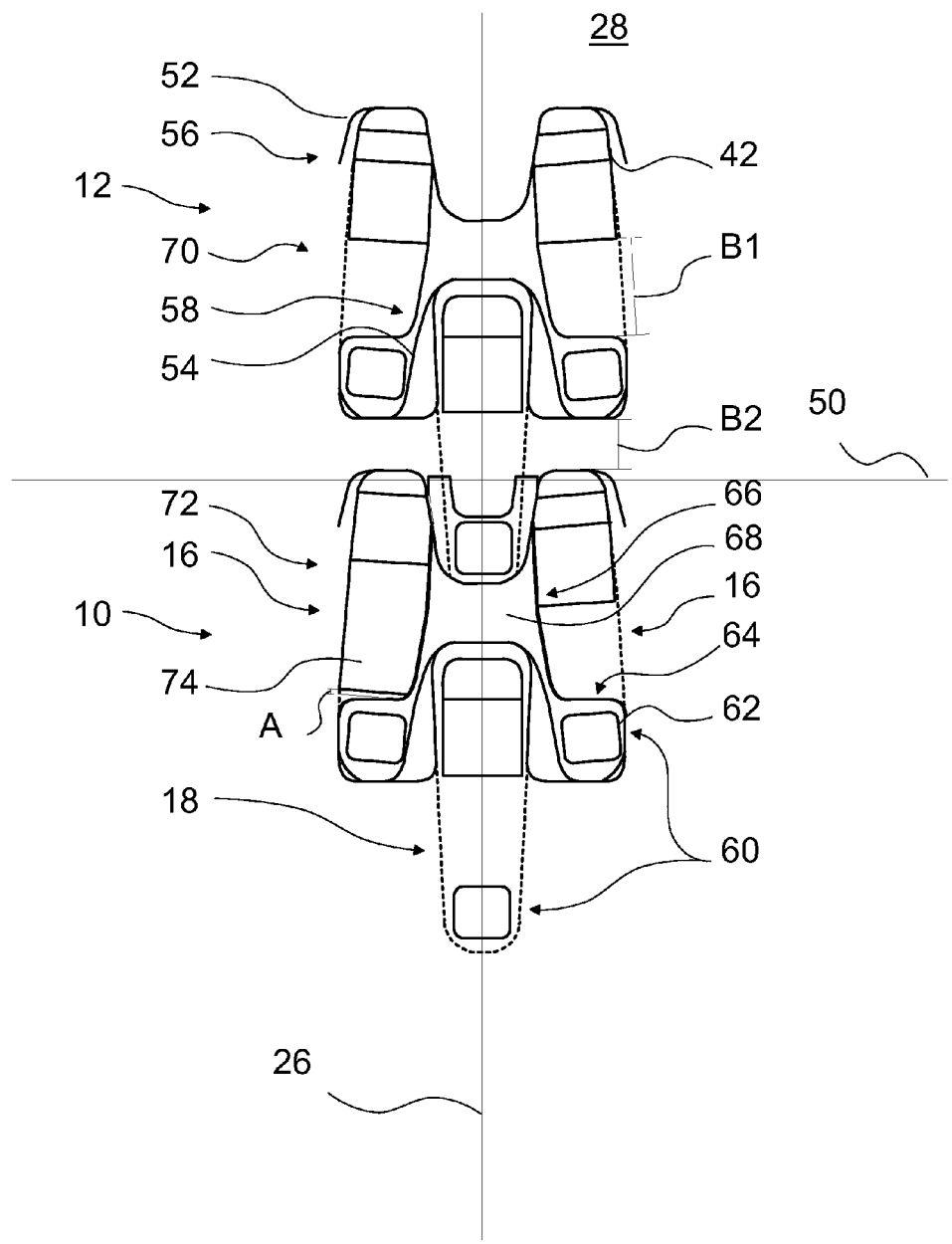
FIG. 2 is a schematic view of two seat groups.

FIG. 1 shows a schematic representation of a seat arrangement in an aircraft cabin comprising a first seat group 10, a second seat group 12 and further seat groups 14, the seat groups 10, 12 and 14 being arranged one behind the other between two cabin aisles 24, 24' running parallel to a longitudinal direction 22 of the passenger cabin and each comprising two outer seat units 16 and one central seat unit 18 (FIG. 2). The central seat units 18 are arranged on a cabin central longitudinal axis 20. The cabin central longitudinal axis 20 runs parallel to the longitudinal direction 22 of the passenger cabin. The individual seat groups 10, 12 and 14 are arranged centrally on the cabin central longitudinal axis 20.

Furthermore, FIG. 2 shows that the outer seat units 16 are arranged mirror-symmetrically with respect to a plane 26 which stands perpendicularly on a cabin floor 28 and is disposed along the cabin central longitudinal axis 20.

In addition, as shown in FIG. 1, outer seat groups 32 each comprising two seat units 34 are arranged against a cabin outer wall 30. The seat units 34 each have a backrest 36. With a backrest 36 of one of the two seat units 34 standing perpendicularly to the cabin floor 28, a seat direction 38 is defined by an axis standing perpendicularly to a main support surface 40 of the backrest 36. The seat directions 38 of the seat units 34, 36 of the outer seat groups 32 are rotated with respect to the longitudinal direction 22 of the passenger cabin and include with it an angle W1 of 5°.

The respective central seat units 18 of the seat groups 10, 12 and 14 are displaced by half a seat unit length L with respect to the outer seat units 16 of the same seat group 10, 12 and 14 in the longitudinal direction 22 of the passenger cabin, and are therefore arranged with an offset. As shown in FIG. 2, the outer seat units 16 have unobstructed access with a passage width B1 of 80 cm to one of the two cabin aisles 24, 24'. Each central seat unit 18 has unobstructed access with a passage width B2 of 50 cm to both cabin aisles 24, 24'.

The seat units 16, 18 each have an adjustable backrest 42. With a backrest 42 of one of the outer seat units 16 standing perpendicularly to the cabin floor 28, a seat direction 44 is defined by an axis standing perpendicularly to a main support surface 46 of the backrest 42, as shown in FIG. 1. The seat directions 44 of the outer seat units 16 of the seat groups 10, 12 and 14 are rotated with respect to the longitudinal direction 22 of the passenger cabin. They include with it an angle W2 of 5°. The backrest 42 can be adjusted within a backrest range 56. The seat direction 44 of the central seat units 18 is aligned parallel to the longitudinal direction 22 of the passenger cabin.

FIG. 1 also shows the central seat units 18 in a sitting configuration 70. The number of connecting passageways 48 running transversely to the longitudinal direction 22 of the passenger cabin between the cabin aisles 24, 24' is equal to the number of central seat units 18 which are in the sitting configuration 70.

As FIG. 2 also shows, the central seat unit 18 of the second seat group 12, when viewed transversely to the longitudinal direction 22 of the passenger cabin, is arranged overlapping with the outer seat units 16 of the first seat group 10. An imaginary plane 50 arranged perpendicularly to the longitudinal direction 22 of the passenger cabin intersects both the first seat group 10 and the second seat group 12.

In addition, each seat group 10, 12 and 14 has a rear privacy unit 52 and a central privacy unit 54. The rear privacy unit 52 is arranged rearwardly behind the outer seat units 16 and extends from one cabin aisle 24 to the other cabin aisle 24'. Both outer seat units 16 are therefore screened towards the rear. The central privacy unit 54 is located partially ahead of the outer seat units 16, partially behind the central unit 18, and also extends from one cabin aisle 24 to the other cabin aisle 24'.

The rear privacy units 52 and the central privacy units are positionally fixed with respect to the cabin floor 28. An adjustment of the backrest 42 of the seat units 16, 18 takes place in the longitudinal direction 22 of the passenger cabin, viewed in front of the respective privacy units 52, 54.

The rear privacy unit 52 surrounds a respective rear backrest region 56 of the outer seat units 16 of the seat groups 10, 12 and 14. The central privacy unit 54 surrounds a backrest region 58 of the central seat unit 18. The privacy units 52, 54 are each formed in one piece from an impact-resistant plastics material.

As FIG. 2 also shows, the seat units 16, 18 each have a footrest unit 60. The footrest unit 60 consists of a footstool and forms the end of a front part of the respective seat unit 16, 18. The external shape of the footstool corresponds substantially to that of a cube. In this case a cube edge 62 of the cube is arranged parallel to the seat direction 44 of the respective seat unit 16, 18.

Each footrest unit 60 further has a stowage unit 64. The stowage unit 64 is formed as a recess in the footstool in which, in particular, personal effects or hand luggage can be stowed.

FIG. 2 shows in addition, behind the central seat units 18 of the seat groups 10, 12, 14 viewed in the seat direction thereof, a tray unit 66 having a tray surface 68. The tray surface 68 ends flush against the outer seat units 16 of the respective seat groups 10, 12 and 14.

As shown in FIG. 2, the seat units 16, 18 of the seat groups 10 and 12 are adjustable from a sitting configuration 70 to a reclining configuration 72 and inversely. In the reclining configuration 72 a distance A of a leg-supporting element 74 of the respective seat unit 16, 18 from the footrest unit 60 is approximately three cm.

The invention claimed is:

1. A seat arrangement of a passenger cabin, comprising:
   two cabin aisles running parallel to a longitudinal direction of the passenger cabin; and
   at least two seat groups extending between the two cabin aisles, each seat group including two outer seat units and exactly one central seat unit arranged between the two outer seat units, the seat units being set in a sitting configuration, the two seat groups being arranged one behind the other in the longitudinal direction of the passenger cabin, wherein each seat unit of the at least two seat groups is arranged and configured to provide unobstructed access to at least one cabin aisle of the two cabin aisles, including:

a central seat unit of one of the two seat groups is arranged offset to at least one of the outer seat units of the same seat group by a distance from the longitudinal direction of the passenger cabin, at least one of the outer seat units is angled in a seat direction with respect to the longitudinal direction of the passenger cabin, and the seat direction of the central seat unit is aligned parallel to the longitudinal direction of the passenger cabin.

2. The seat arrangement as claimed in claim 1, wherein a number of connecting passageways disposed transversely to the longitudinal direction of the passenger cabin between the cabin aisles is at least equal to a number of central seat units which are in a sitting configuration.

3. The seat arrangement as claimed in claim 1, wherein at least one plane arranged perpendicularly to the longitudinal direction of the passenger cabin intersects at least two seat groups.

4. The seat arrangement as claimed in claim 1, wherein at least one of the seat groups has at least one privacy unit which is provided in order to screen the seat units of the respective seat group at least towards the rear.

5. The seat arrangement as claimed in claim 4, wherein at least two of the seat units of one of the seat groups are surrounded at least partially by the at least one privacy unit.

6. The seat arrangement as claimed in claim 4, wherein the at least one privacy unit is formed in one piece.

7. The seat arrangement as claimed in claim 1, wherein at least one of the seat units has a footrest unit.

8. The seat arrangement as claimed in claim 7, wherein the footrest unit has a stowage unit.

9. The seat arrangement as claimed in claim 1, wherein a tray unit that is arranged behind the central seat unit of one of the seat groups, viewed in the seat direction thereof, that connects each of the outer seat units of the same seat group, and that ends flush against the outer seat units of the same seat group, and the tray unit is provided in order to make available a tray surface for the outer seat units of the same seat group.

10. The seat arrangement as claimed in claim 1, further comprising at least one seat unit which is adjustable from a sitting configuration to a reclining configuration and inversely.

11. The seat arrangement as claimed in claim 1, wherein at least one plane arranged perpendicularly to the longitudinal direction of the passenger cabin intersects at least two seat groups.

12. The seat arrangement as claimed in claim 2, wherein at least one plane arranged perpendicularly to the longitudinal direction of the passenger cabin intersects at least two seat groups.

13. The seat arrangement as claimed in claim 1, wherein at least one of the seat groups has at least one privacy unit which is provided in order to screen the seat units of the respective seat group at least towards the rear.

14. The seat arrangement as claimed in claim 2, wherein at least one of the seat groups has at least one privacy unit which is provided in order to screen the seat units of the respective seat group at least towards the rear.

15. The seat arrangement as claimed in claim 3, wherein at least one of the seat groups has at least one privacy unit which is provided in order to screen the seat units of the respective seat group at least towards the rear.

16. The seat arrangement as claimed in claim 5, wherein the at least one privacy unit is formed in one piece.

17. The seat arrangement as claimed in claim 1, wherein at least one of the seat units has a footrest unit.

18. The seat arrangement as claimed in claim 2, wherein at least one of the seat units has a footrest unit.

19. The seat arrangement as claimed in claim 1, wherein an angle between the seat direction of the outer seat units and the longitudinal direction of the passenger cabin is 5 degrees.

20. The seat arrangement as claimed in claim 1, wherein the seat direction of the one outer seat unit has an angle towards the longitudinal axis of the passenger cabin that differs from 0.

21. A seat arrangement of a passenger cabin, comprising:
two cabin aisles running parallel to a longitudinal direction of the passenger cabin; and
at least two seat groups extending between the two cabin aisles, each seat group including two outer seat units and exactly one central seat unit arranged between the two outer seat units, the seat units being set in a sitting configuration, the two seat groups being arranged one behind the other in the longitudinal direction of the passenger cabin,
wherein each seat unit of the at least two seat groups is arranged and configured to provide unobstructed access to at least one cabin aisle of the two cabin aisles, including:
a central seat unit of one of the two seat groups is arranged offset to at least one of the outer seat units of the same seat group by a distance from the longitudinal direction of the passenger cabin,
at least one of the outer seat units is angled in a seat direction with respect to the longitudinal direction of the passenger cabin, and
both of the two outer seat units are angled respectively in opposite directions relative to the longitudinal axis of the passenger cabin and without crossing the longitudinal axis of the passenger cabin.

22. The seat arrangement as claimed in claim 1, wherein each of the outer seat units includes an outer cubical-footstool attached to different sides of the central seat unit, and
the central seat unit includes a central cubical-footstool attached to inner-facing sides of each of the outer seat units.

23. The seat arrangement as claimed in claim 21, wherein each of the outer seat units includes an outer cubical-footstool attached to different sides of the central seat unit, and
the central seat unit includes a central cubical-footstool attached to inner-facing sides of each of the outer seat units.

* * * * *